US012608649B2

(12) United States Patent
Chopde et al.

(10) Patent No.: US 12,608,649 B2
(45) Date of Patent: Apr. 21, 2026

(54) SYSTEM AND METHOD FOR EFFICIENT MACHINE LEARNING

(71) Applicant: Fractal Analytics Private Limited, Oberoi Garden City (IN)

(72) Inventors: Abhishek Chopde, Maharashtra (IN); Kunal Singh, Kolkata (IN); Prosenjit Banerjee, Electronic City (IN); Pradeep Moturi, Tanuku (IN); Souvik Mandal, Bankura (IN); Prankur Rusia, Bhilai (IN)

(73) Assignee: Fractal Analytics Private Limited, Oberoi Garden City (IN)

( * ) Notice: Subject to any disclaimer, the term of this patent is extended or adjusted under 35 U.S.C. 154(b) by 854 days.

(21) Appl. No.: 17/887,056

(22) Filed: Aug. 12, 2022

(65) Prior Publication Data

US 2023/0419170 A1     Dec. 28, 2023

(30) Foreign Application Priority Data

Jun. 24, 2022   (IN) ............................. 202221036468

(51) Int. Cl.
G06N 20/00       (2019.01)
G06N 3/08        (2023.01)

(52) U.S. Cl.
CPC ............... G06N 20/00 (2019.01); G06N 3/08 (2013.01)

(58) Field of Classification Search
None
See application file for complete search history.

(56) References Cited

U.S. PATENT DOCUMENTS

| | | | | |
|---|---|---|---|---|
| 11,100,373 | B1 * | 8/2021 | Crosby ................. | G16H 30/40 |
| 11,176,154 | B1 * | 11/2021 | Dasgupta ............... | G06F 9/451 |
| 11,620,515 | B2 * | 4/2023 | Liu ........................ | G06F 40/30 |
| | | | | 706/45 |
| 12,067,082 | B2 * | 8/2024 | Panda .................... | G06F 18/24 |
| 2021/0264106 | A1 * | 8/2021 | Li ....................... | G06F 18/2148 |
| 2021/0357762 | A1 * | 11/2021 | Clement ............... | G06N 3/045 |
| 2022/0414476 | A1 * | 12/2022 | Lin ..................... | G06F 18/2185 |
| 2023/0111306 | A1 * | 4/2023 | Anand .................. | G06T 7/0014 |
| | | | | 382/128 |
| 2023/0162049 | A1 * | 5/2023 | Hall ..................... | G06F 18/217 |
| | | | | 706/45 |
| 2023/0419170 | A1 * | 12/2023 | Chopde .................. | G06N 20/00 |
| 2024/0054637 | A1 * | 2/2024 | Parkinson ............. | G06T 7/0012 |
| 2024/0212080 | A1 * | 6/2024 | Dorodchi .......... | G06Q 50/2053 |

* cited by examiner

*Primary Examiner* — Eliyah S. Harper

(74) *Attorney, Agent, or Firm* — Wiley Rein LLP

(57)               ABSTRACT

Systems and methods employ knowledge distillation for efficient machine learning. Systems and methods integrate self-supervised learning, supervised learning, semi-supervised learning and active learning, each of which learning is executed in an iterative fashion. The system comprises three main components: a database server, a data analytics system and a standard dashboard. The database server contains real-time inventory images as well as historical images of each product type. The data analytics system is executed by a computer processor configured to apply a multi-head self-supervised learning-based deep neural network. The standard dashboard is configured to output a report regarding the object information.

14 Claims, 3 Drawing Sheets

SYSTEM AND METHOD FOR EFFICIENT MACHINE LEARNING

RELATED APPLICATION

This application claims the priority benefit of Indian Patent Application No. 202221036468, filed Jun. 24, 2022, which is incorporated entirely by reference herein for all purposes.

BACKGROUND

Artificial intelligence, implemented with neural networks and deep learning models, has demonstrated great promise as a technique for automatically analyzing real-world information with human-like accuracy. In general, such neural network and deep learning models receive input information and make predictions based on the same. Neural networks learn to make predictions gradually, by a process of trial and error, using a machine learning process. A given neural network model may be trained using a large number of training examples, proceeding iteratively until the neural network model begins to consistently make similar inferences from the training examples that a human might make.

To learn a reliable model, it usually requires plenty of labeled data. However, labeled data are expensive and scarce. In many real-world applications, it is relatively easy to acquire a large amount of unlabeled data. For example, documents can be crawled from the web, images can be obtained from surveillance cameras, microscopy experiments, and speech can be collected from broadcast. However, their corresponding labels for the prediction task often requires slow human annotation and expensive laboratory experiments. Thus, while advances in object detection have relied on increasingly deeper architectures, such architectures are associated with an increase in computational expense at runtime.

Therefore, there is still a need for an improved machine learning platform that can efficiently learn to reach good performance with a small number of labeled data and massive amount of unlabeled data.

SUMMARY

The instant disclosure describes various techniques that overcome the above noted limitations of prior art techniques through the use of a framework for knowledge distillation in deep learning that can transfer knowledge from a network with a large number of parameters to a compressed one.

According to some embodiments, the present disclosure provides systems and methods that integrate self-supervised learning, supervised learning, semi-supervised learning and active learning, each of which learning is executed in an iterative fashion. In some embodiments, semi-supervised learning involves self-supervised pretraining, followed by supervised fine-tuning. This pipeline leverages unlabeled data in both task-agnostic and task-specific way during pretraining, while the supervised labels are used during fine-tuning. Once a convolutional network is pretrained and fine-tuned, its task-specific predictions can be further improved and distilled into a smaller network. To this end, unlabeled data are used for a second time to encourage the student network to mimic the teacher network's label predictions.

According to some embodiments, the present disclosure provides systems and methods that employ knowledge distillation for efficient machine learning. The knowledge distillation machine learning can transfer the knowledge in a complex model (teacher) to a simple model (student), namely the knowledge distributed by the routes learned by the teacher model can be transferred to the student model trained, and the student model can obtain better prediction effect than the student model trained alone with less complexity and higher training speed by utilizing the knowledge learned from the teacher model.

In some embodiments, the systems and methods are implemented with a self-supervised learning backbone teacher model and a semi-supervised learning student model, each of which comprise one or more shared layers. During training of the backbone model, its shared layers are initialized. The backbone model predicts teacher logits. During training of the student model, its shared layers are initialized. Knowledge distillation is employed to transfer knowledge from the backbone model to the student model by the student model updating its shared layers.

In some embodiments, a duplicate removal module of the current invention is configured to use cosine similarity of the extracted feature of the unlabeled dataset to remove similar images. This uniquely helps the active learning module select distinct images as annotating similar images would not help in improving model performance.

In some embodiments, an accuracy check module is contemplated to evaluate the accuracy of the trained models. A performance threshold is set when the training process is started. After every iteration, the performance of the trained models including the finetuned teacher model and distillation student model is calculated, and the iterative training ends if either the supervised or one of the distillation models reach the threshold-target accuracy.

According to some embodiments, a system for efficient machine learning includes a data analytics system, a data server and a standard dashboard. The data server contains real-time data as well as historical data. The data analytics system is executed by a computer processor configured to apply object detection and classification and deep learning algorithms to detect object information captured by the image. The standard dashboard is configured to output a report regarding the product information.

According to some embodiments, the present disclosure provides a method for efficient machine learning comprises steps of: (1) self-supervised pretraining, (2) supervised finetuning, (3) distillation using unlabeled data, and (4) supervised active learning with manually annotated data for validation.

One embodiment may provide a system for efficient machine learning, comprising:

a database server executed by one or more storage devices for storing data;

a data analytics system comprising one or more convolutional neural networks; and a standard dashboard;

wherein the data analytics system comprises a non-transitory computer-readable medium and instructions that when executed by the non-transitory computer-readable medium cause the non-transitory computer-readable medium to perform operations comprising:

inputting labeled data, unlabeled data, and test data into a computer memory;

performing an initial self-supervised pretraining using the labeled data, the unlabeled data, and the test data to output a trained teacher model;

supervised finetuning the trained teacher model using the labeled data and the test data to output a finetuned teacher model;

performing a semi-supervised learning guided by the finetuned teacher model using the labeled data, the unlabeled data, and the test data to output a trained student model;

acquiring a first data output by the finetuned teacher model and a second data output by the trained student model;

obtaining a distillation loss value according to a distillation loss function based on a difference between the first data output and the second data output;

updating parameters of the trained student model based on the distillation loss value until the distillation loss value stops decreasing; and, outputting a target student model when the knowledge distillation training is completed.

An additional embodiment herein provides a method for efficient machine learning, comprising the steps of:

inputting labeled data, unlabeled data, and test data into a computer memory;

performing an initial self-supervised pretraining using the labeled data, the unlabeled data, and the test data to output a trained teacher model;

supervised finetuning the trained teacher model using the labeled data and the test data to output a finetuned teacher model;

performing a semi-supervised learning guided by the finetuned teacher model using the labeled data, the unlabeled data, and the test data to output a trained student model;

acquiring a first data output by the finetuned teacher model and a second data output by the trained student model;

obtaining a distillation loss value according to a distillation loss function based on a difference between the first data output and the second data output;

updating parameters of the trained student model based on the distillation loss value until the distillation loss value stops decreasing; and, outputting a target student model when the knowledge distillation training is completed.

The advantages of the exemplary embodiments are at least as follows: the exemplary embodiments retain accuracy similar to a complex model, while achieving speeds similar to a compressed model, and the exemplary embodiments can transfer knowledge from a deep model to a shallower one, allowing for faster speeds at the same training effort. Further advantages of the exemplary embodiments include the ability to design an effective framework that can transfer knowledge from a more expensive model to a cheaper one, allowing faster speed with minimal loss in accuracy and high accuracy at lower computational cost.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

Figure 1:
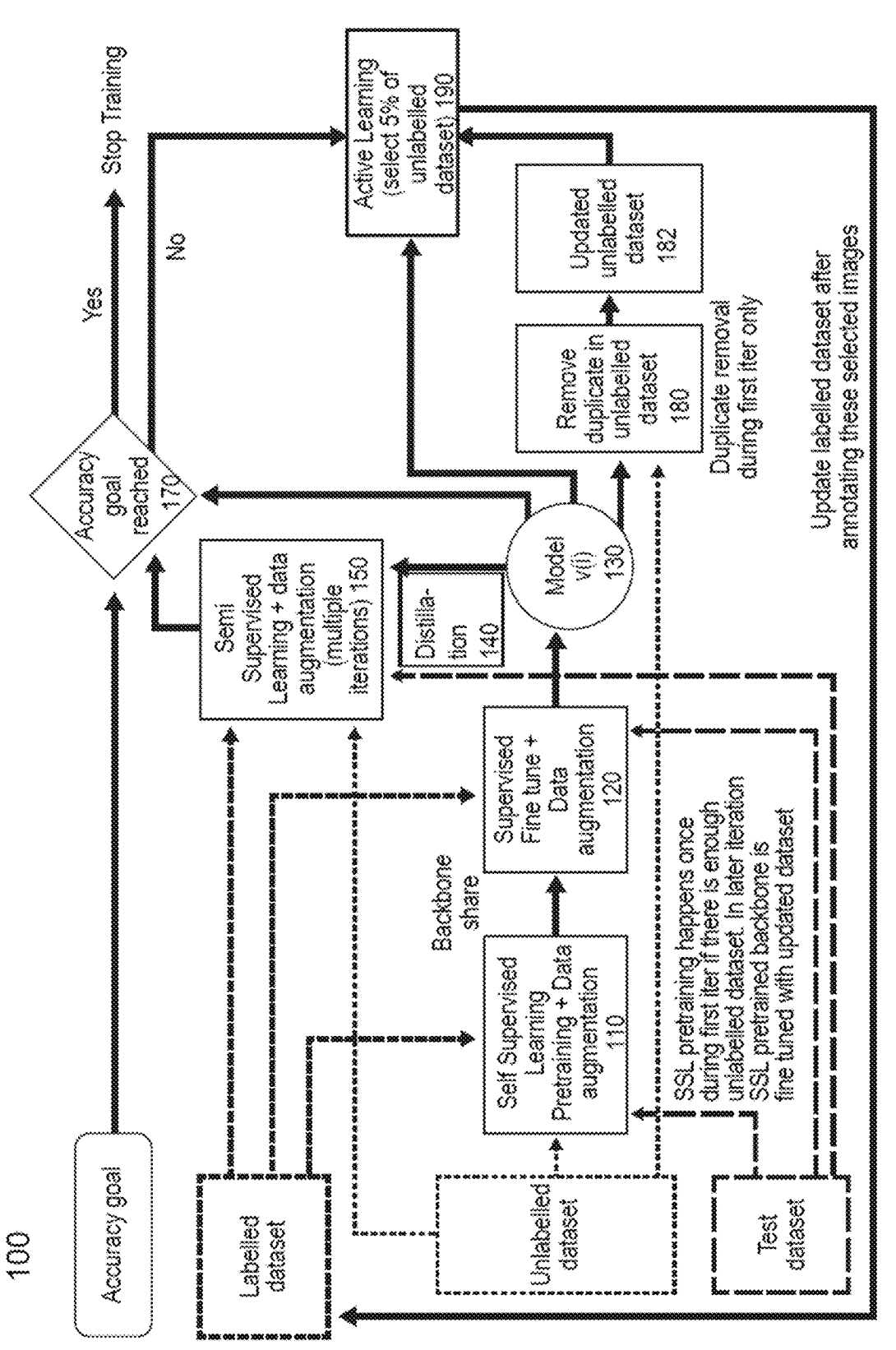
FIG. 1 depicts an exemplary workflow of the knowledge distillation machine learning.

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

As used herein, the term "module" may comprise hardware or software-based framework that performs one or more functions. In some embodiments, the module may be implemented on one or more neural networks.

As used herein, the term "network" may comprise any hardware or software-based framework that includes any artificial intelligence network or system, neural network or system and/or any training or learning models implemented thereon or therewith.

"Deep learning" refers to a subfield of machine learning concerned with algorithms inspired by the structure and function of the brain called artificial neural networks.

"Convolutional neural network (CNN)" a class of deep neural networks, most commonly applied to analyzing visual imagery. They are also known as shift invariant or space invariant artificial neural networks (SIANN), based on their shared-weights architecture and translation invariance characteristics. They have applications in image and video recognition, recommender systems, image classification, medical image analysis, and natural language processing.

"Recurrent neural network (RNN)" is a class of artificial neural networks where connections between nodes form a directed graph along a temporal sequence. This allows it to exhibit temporal dynamic behavior. Unlike feedforward neural networks, RNNs can use their internal state (memory) to process sequences of inputs. This makes them applicable to tasks such as unsegmented, connected handwriting recognition or speech recognition.

"Artificial neural networks (ANN)" or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labelled as "cat" or "no cat" and using the results to identify cats in other images. They do this without any prior knowledge of cats, for example, that they have fur, tails, whiskers, and cat-like faces. Instead, they automatically generate identifying characteristics from the examples that they process.

A "multilayer perceptron (MLP)" is a class of feedforward artificial neural network (ANN). The term MLP is used ambiguously, sometimes loosely to refer to any feedforward ANN, sometimes strictly to refer to networks composed of multiple layers of perceptrons (with threshold activation). Multilayer perceptrons are sometimes colloquially referred to as "vanilla" neural networks, especially when they have a single hidden layer.

"Unsupervised machine learning (ML)" refers to unsupervised machine learning algorithms that gather patterns from a dataset without reference to known, or labelled outcomes.

"Upsample" refers to any technique that upsamples image to a higher resolution.

"Application programming interface (API)" is an interface or communication protocol between different parts of a computer program intended to simplify the implementation and maintenance of software.

"Decision-tree" is a decision support tool that uses a tree-like model of decisions and their possible consequences, including chance event outcomes, resource costs, and utility. It is one way to display an algorithm that only contains conditional control statements.

"Microservice" are a software development technique—a variant of the service-oriented architecture (SOA) structural style—that arranges an application as a collection of loosely coupled services. In a microservices architecture, services are fine-grained and the protocols are lightweight.

"Support-vector machines (SVM)" are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on the side of the gap on which they fall.

"Pseudo labels" are automatically generated labels based on data attributes for pretext tasks.

"Pretext tasks" are pre-designed tasks for networks to solve, and visual features are learned by learning objective functions of pretext tasks.

"Downstream tasks" are computer vision applications that are used to evaluate the quality of features learned by self-supervised learning. These applications can greatly benefit from the pretrained models when training data are scarce. In general, human-annotated labels are needed to solve the downstream tasks. However, in some applications, the downstream task can be the same as the pretext task without using any human-annotated labels.

"Self-supervised Learning" is a subset of unsupervised learning methods. Self-supervised learning refers to learning methods in which ConvNets are explicitly trained with automatically generated labels.

"Residual neural network (ResNet)" is an artificial neural network (ANN) of a kind that builds on constructs known from pyramidal cells in the cerebral cortex. Residual neural networks do this by utilizing skip connections, or shortcuts to jump over some layers.

"AlexNet" is the name of a convolutional neural network (CNN), designed by Alex Krizhevsky. The architecture consists of eight layers: five convolutional layers and three fully-connected layers.

"VGGNet" is invented by Visual Geometry Group (by Oxford University). It makes the improvement over AlexNet by replacing large kernel-sized filters (11 and 5 in the first and second convolutional layer, respectively) with multiple 3×3 kernel-sized filters one-after-another.

"Inception Network" is a type of convolutional neural network classifiers.

"Cosine similarity" a measure of similarity between two sequences of numbers. For defining it, the sequences are viewed as vectors in an inner product space, and the cosine similarity is defined as the cosine of the angle between them, that is, the dot product of the vectors divided by the product of their lengths. It follows that the cosine similarity does not depend on the magnitudes of the vectors, but only on their angle.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

FIG. 1 depicts an exemplary workflow of the knowledge distillation machine learning. The present invention provides an architecture or framework that integrates self-supervised learning, supervised learning, semi-supervised learning, and active learning, each of which learning is executed in an iterative fashion. In some embodiments, in this framework 100, the self-supervised learning backbone model 110 may be pre-trained with an input set of labeled data, unlabeled data, and test data. The labeled data consists of a plurality of objects having a pairing of a label and features. The label of the data consists of a unique name or value that identifies the class the object belongs to. The features represent quantifiable or categorical information associated with the object. The labeled data can be acquired by measuring physical objects or digital representations of objects. The unlabeled data consists of a plurality of objects, each consisting of a plurality of features. The unlabeled data is different from the labeled data due to its absence of known labels. The features associated with each unlabeled object are the same as features associated with the labeled data. The test data is used to compare the model performance across iteration.

In some embodiments, the backbone model implements a neural network model that is relatively large in size and parameters used—e.g., the backbone model may use dozens, if not hundreds, of millions of parameters, which is resource-intensive. Using a big neural network for self-supervised training and fine tuning greatly improves accuracy. In some embodiment, the self-supervised backbone model 110 is a multi-head self-supervised learning-based classifier that consists of two main parts: a single base convolutional encoder that is pre-trained using contrastive loss to extracts features over the whole input data, and multiple projection heads layers to map the features to the space where contrastive loss is applied. The single base encoder is trained using a self-supervised learning technique and is common for all classification tasks. Different projection heads may be used to perform sub-type or other secondary level classification. To perform various sub-types classification, only the head corresponding to their base brand/type may need to be replaced.

The encoder network may be various choices of the network architecture without any constraints. In some embodiments, the encoder network may be ResNet, AlexNet, VGGNet, or Inception network as the backbone. The projection head may be a multilayer perceptron (MLP). As the contrastive loss, normalized temperature-scaled cross-entropy loss (NT-Xent) may be applied.

In some embodiments, an encoder neural network is pre-trained to extract global image representations that are useful for downstream tasks, including objection classification, and constitutes a good initialization that can be fine-tuned into an accurate model. Contrastive learning enforces representations to be similar for similar pairs and dissimilar for dissimilar paris. After training, the encoder weights are frozen so that they are constant. Subsequently, for each secondary level classification, a projection head network is attached to the encoder output and is trained on labelled images. Multiple heads are attached to the encoder and trained for that specific task. Each projection head would not communicate with each other. In other embodiments, part of a MLP projection head is incorporated into the base encoder during the fine-tuning step. As a result, the model is fine-tuned from a middle layer of the projection head, instead of the input layer of the projection head. Fine-tuning from the first layer of the MLP head is the same as adding a fully-connected layer to the base network and removing a fully-connected layer from the head, and the impact of this extra layer is contingent on the amount of labeled examples during fine-tuning.

Having one encoder for multiple projection heads would keep the weight file size almost constant even with growing heads. As each projection head would have a smaller number of parameters and is very easily replaceable, the system will be much more memory and time efficient. Training and deployment time of the system would be reduced by 100%. Further, the system is very cost-effective as there is no human-annotation involved. The accuracies of the system are more stable over a period of time and false positive is reduced by 4×.

In some embodiments, systems and methods employ fine-tuning approaches. The self-supervised backbone model 110 is finetuned with supervised finetune module 120 to generate a finetuned teacher model 130. The supervised finetune module 120 is responsible for loading the self-supervised pre-training backbone model 110, and inputting the training samples including labeled data and test data into the backbone model 110 for fine-tuning, and outputting a finetuned teacher model 130.

In some embodiments, the finetune module 120 comprises the steps of: (1) pretraining a neural network model, i.e., the source model such as ResNet-18, on a source dataset (e.g., the ImageNet dataset); (2) creating a new neural network model, i.e., the finetuned model, which copies all model designs and their parameters on the source model except the output layer that is closely related to the labels of the source dataset; (3) adding an output layer to the finetuned model, whose number of outputs is the number of categories in the target dataset and whose model parameters is randomly initialized; and (4) training the finetuned model on the target dataset. The output layer will be trained from scratch, while the parameters of all the other layers are fine-tuned based on the parameters of the source model.

The supervised finetune module 120 can be embodied in multiple ways. In one embodiment of the invention, the supervised finetune module 120 generates a random forest classifier to act as the output teacher model 130. In another embodiment of the invention, the supervised finetune module 120 generates a support vector machine (SVM) to act as the output teacher model 130.

In some embodiments, the supervised finetune module 120 comprises a data augmentation component that transforms any given data randomly resulting in two correlated views of the same example, which are considered as a positive pair. The augmentation module may comprise cropping and resizing, rotation and cutout, color distortions, Gaussian blur, and Sobel filtering.

In some embodiments, knowledge distillation is employed to distill knowledge from a teacher model 130 to a student model 150. The knowledge distillation module 140 uses the teacher model 130 obtained by the supervised finetune module 120 to update parameters of the student model 150. Specifically, the system inputs training data in the labeled data set into a teacher model 130 and a student model 150 simultaneously for data processing, then calculates loss information of knowledge distillation according to the outputs of the teach model 130 and the student model 150, updates the current student model 150 based on the loss information of knowledge distillation and continuously iterates circularly, and when the knowledge distillation training is completed, obtains the target student model 150.

In some embodiments, knowledge distillation is performed offline, where a finetuned teacher model is used to guide the student model. In this scheme, the teacher model is first pre-trained and finetuned on a training dataset, and then knowledge from the teacher model is distilled to train the student model. In another embodiment, online knowledge distillation is used where both the teacher and student models are updated simultaneously in a single end-to-end training process. Online distillation can be operationalized using parallel computing thus making it a highly efficient method. In another embodiment, self-distillation is used where the same model is used for the teacher and the student models. For instance, knowledge from deeper layers of a deep neural network can be used to train the shallow layers. Knowledge from earlier epochs of the teacher model can be transferred to its later epochs to train the student model.

In some embodiments, adversarial learning in the context of generative adversarial networks (GANs), is used to train a generator model (G) that learns to generate synthetic data samples as close as possible to the true data distribution and a discriminator model (D) that learns to discriminate between the authentic and synthetic data samples. To meet the objective of learning the true data distribution, adversarial learning can be used to train a generator model to obtain synthetic training data to use as such or to augment the original training dataset. A second adversarial learning-based distillation method focuses on a discriminator model to differentiate the samples from the student and the teacher models based on either logits or feature maps. This method helps the student mimic the teacher well. The third adversarial learning-based distillation technique focuses on online distillation where the student and the teacher models are jointly optimized.

In some embodiments, the fine-tuned network as a teacher model 130 is used to impute labels for training a student model 150. The distillation loss is minimized where no real labels are used. The teacher model 130 is fixed during the distillation; only the student model 150 is trained. In general only unlabeled data is used in distillation. But when the number of labeled examples is significant, one can also combine the distillation loss with ground-truth labeled examples using a weighted combination. This procedure can be performed using students either with the same model architecture (self-distillation), which further improves the task-specific performance, or with a smaller model architecture, which leads to a compact model.

In some embodiments, the student model 150 is typically computationally cheaper than teacher model 130. For example, it may be shallower, thinner, or composed of cheaper operations. The labeled data, the unlabeled data, test data and the teacher model 130 are processed by the semi-supervised learning to produce an updated student model 150. In certain embodiment, the unlabeled data whose label can be inferred based upon the labeled data and the teacher model 130.

In some embodiments, the student model is fine-tuned based on the current student model obtained from the knowledge distillation. It recombines all the encoder unit modules of the student network into a complete encoder, and uses the feature layer and output layer of the teacher network to fine-tune the downstream task scenes.

In some embodiments, performing data processing evaluation on the current student model 150 bases on the test data. The test data is used as input, the current student model 150 is used for predicting, and the prediction result is evaluated, so that the data processing accuracy is obtained.

The knowledge distillation training completion condition is a preset condition for finishing the knowledge distillation training, and comprises at least one of the training times reaching the maximum iteration times, the knowledge distillation loss value being less than a preset loss threshold value and the parameters in the current image processing model not changing any more. When the knowledge distillation loss value is above a certain threshold value, knowledge distillation training restarts.

Specifically, when the knowledge distillation training completion condition is not met, the system executes the knowledge distillation training, network parameters in the current student model are updated by using knowledge distillation loss information, a training data set is returned to be input into the current student model for data processing, the step of obtaining the current processing result is executed in an iteration mode, and when the knowledge distillation training completion condition is met, the current student model when the knowledge distillation training completion condition is met is used as the target student model.

In the embodiment of the present disclosure, the distillation loss function includes the difference between the first output data of the finetuned teacher mode and the second output data of the trained student model to obtain the distillation loss value, and the student model can update the parameters of the model according to the distillation loss value. The larger the difference between the first output data of the updated teacher mode and the second output data of the trained student model is, the larger the distillation loss value is, and the larger the amplitude of the parameters required to be adjusted by the student model is. The training process is a process for reducing the loss value, so that the student model updates parameters according to the distillation loss value.

According to some embodiments, if the finetuned teacher model 130 or the distilled student model 150 reaches target accuracy 170, the system stops the whole learning process. In some embodiments, supervised finetuning of the trained teacher model or semi-supervised training of the trained student model stops when an accuracy of the finetuned teacher model or the updated student model does not improve in consecutive epochs. In some embodiments, if the accuracy goal is not met, the unlabeled dataset is updated with duplicate removal module 180 to remove similar images from final unlabeled dataset to generate updated unlabeled dataset 182. In some embodiments, the duplicate removal module 180 uses cosine similarity as a measure of the similarity and/or dissimilarity of the at least a portion of the extracted feature of the unlabeled dataset to remove similar data. Then the finetuned teacher model 130 and the updated unlabeled dataset 182 are processed by the active learning module 160, which uses entropy based or loss prediction based method to select a subset of the unlabeled data for human to validate and annotate. For entropy based selection, the system calculates the entropy value of each label in the training set sample, selects a proper label subset through sorting the label entropy values, and performs parameter analysis to obtain the optimal label subset number and voting threshold. The subset of the unlabeled data for human to validate and annotate may be about 5% of the unlabeled data. The selected unlabeled data is removed from the unlabeled data set and the newly annotated data is added to the labeled data set for the next iteration.

Figure 2:
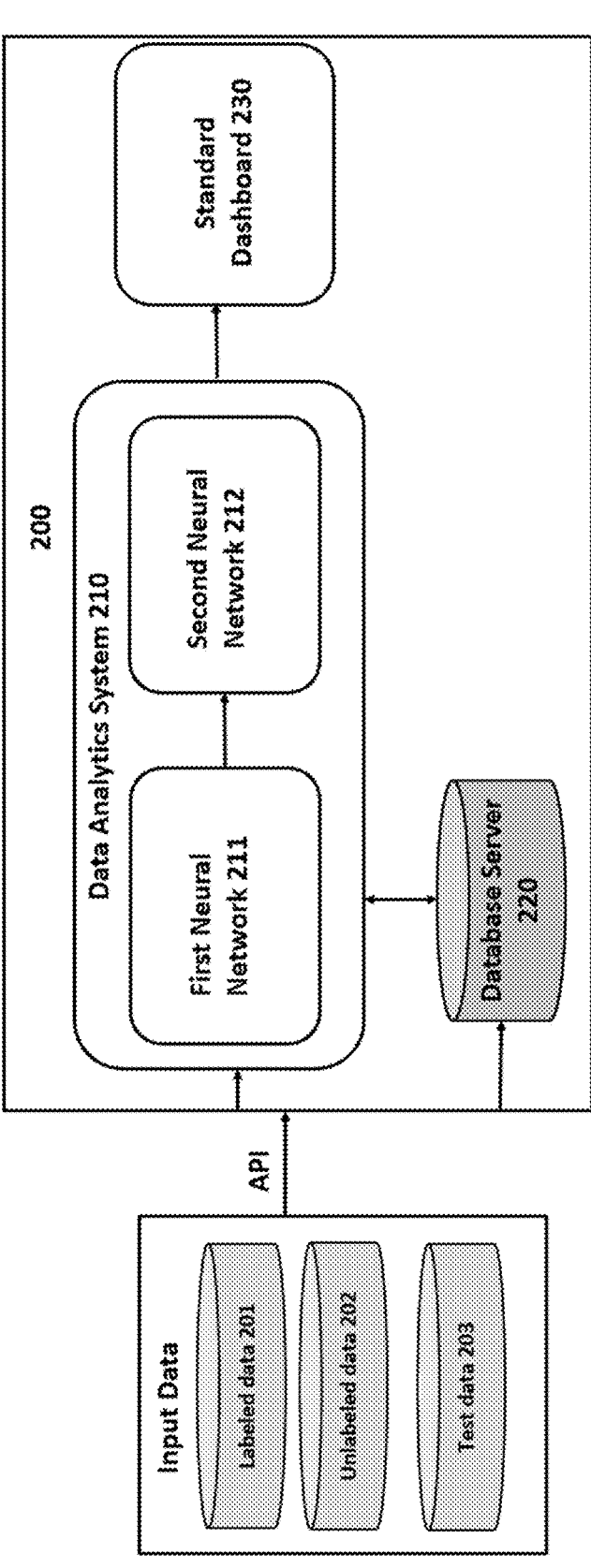
FIG. 2 depicts a block diagram of the system for efficient machine learning.

FIG. 2 depicts an exemplary system for efficient machine learning for object detection with knowledge distillation, in accordance with embodiments of the present invention. The system 200 comprises three main components: a data analytics system 210, a database server 220, and a standard dashboard 230. The database server 220 contains real-time images as well as historical images. The data analytics system 210 is executed by a computer processor configured to apply deep learning algorithms to detect object information captured by the image. The standard dashboard 230 is configured to output a report regarding the object information. The present system may apply to video data or other data following a similar architecture.

The present invention uses microservice API infrastructure to allow real time data processing. In a microservice environment, a real time API proxy makes it easy to listen for instant updates from other microservices without the need for a centralized message broker. Each microservice gets its own proxy instance, and microservices communicate with each other via an organization's own API contracts rather than a vendor-specific mechanism.

Data analytics system 210, database server 220, and standard dashboard 230 may be any type of computer device, including but not limited to a personal computer, a server computer, a series of server computers, a mini computer, and a mainframe computer, or combinations thereof. Data analytics system 210, database server 220, and standard dashboard 230 may each be a web server (or a series of servers) running a network operating system. database server 220 connects to one or more external data sources, including real-time camera capturing images, through one or more networks, including but not limited to, local-area networks (LANs), wide-area networks (WANs), world wide web (WWW), or any combination thereof.

In some embodiment, data analytics system 210 may comprise two neural networks 211 and 212. The data analytics system may contain more than two neural networks arranged in a sequence, wherein an output generated by a neural network may be fed into the subsequent neural network.

In general, the image semantic segmentation is achieved based on convolutional neural networks (CNNs). To this end, the data analytics system 210 is trained using the training data stored in the database server 220 or from outside database. The training data includes a plurality of training images.

Figure 3:
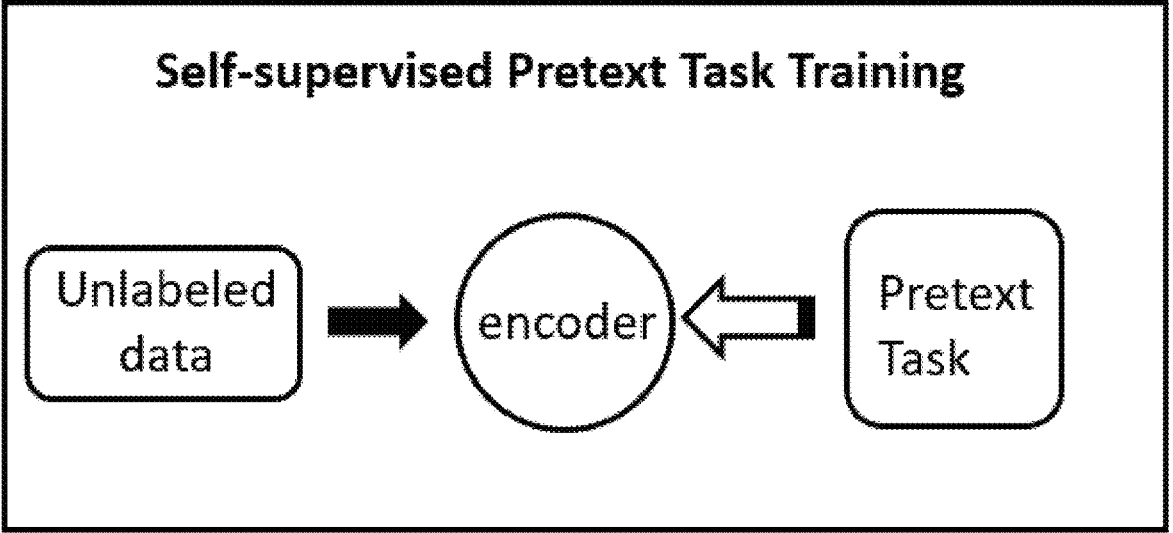
FIG. 3 illustrates an example of multi-head self-supervised learning-based classifier.
Figure 3:
Figure 3:
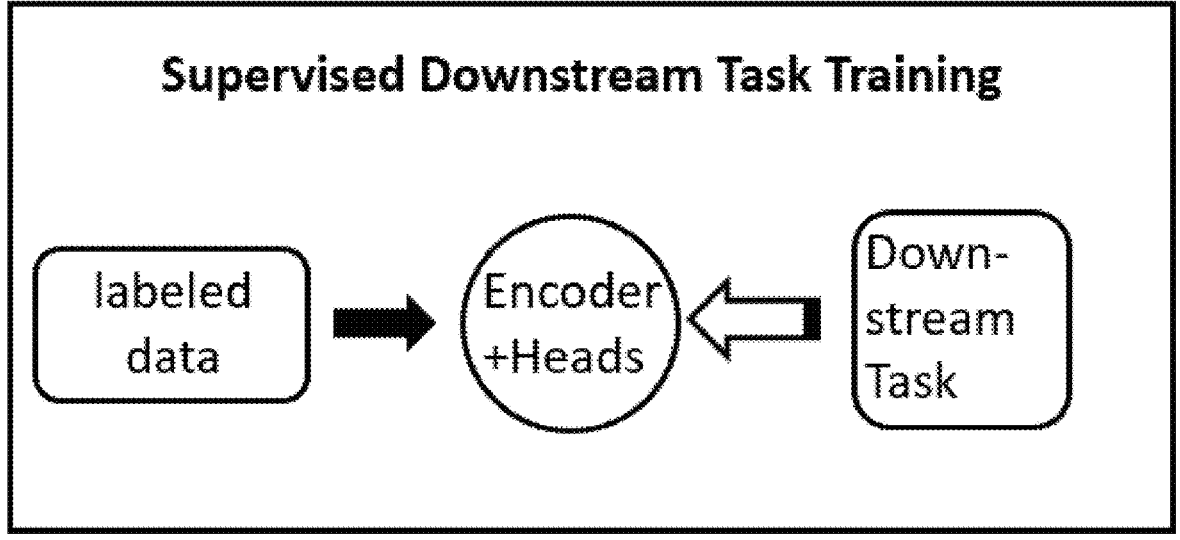

FIG. 3 illustrates an exemplary self-supervised learning pipeline. During the self-supervised training phase, a predefined pretext task is designed for the encoder to solve, and the pseudo labels for the pretext task are automatically generated based on some attributes of data. Then the encoder network is trained with a plurality of unlabeled data to learn object functions of the pretext task. After the self-supervised training finishes, the learned visual features can be further transferred to different projection heads for downstream tasks as pretrained models to improve performance and overcome overfitting. Generally, shallow layers capture general low-level features like edges, corners, and textures while deeper layers capture task related high-level features. Therefore, visual features from only the first several layers are transferred during the supervised downstream task training phase.

In some embodiments, a pretext task is defined for an encoder network to solve and visual features can be learned through the process of accomplishing this pretext task. The pseudo labels for pretext task can be automatically generated without human annotations. The encoder network is optimized by minimizing the error between the prediction of output and the pseudo labels. The quality of this prediction is then evaluated using a contrastive loss. Contrastive loss takes the output of the encoder network for a positive example and calculates its distance to an example of the same class and contrasts that with the distance to negative examples. The loss is low if positive samples are encoded to similar (closer) representations and negative examples are encoded to different (farther) representations. Contrastive loss helps learn representations by maximizing agreement between differently augmented views of the same data example. Number of pairs either positive (augmented views of same data) or negative (augmented views of different data) are sampled from the batch of images and passed on to the network and to calculate contrastive loss at the end to help make the network/model robust. To adapt contrastive loss to self-supervised learning, the encoder network is pre-trained using contrastive loss to embed samples guided by their labels. Then the encoder weights are frozen so that they are constant. Then a projection head is attached to the encoder output and is trained on labelled data to produce a final representation.

The projection head may be a multilayer perceptron (MLP). Multiple projection heads may be attached to the encoder and are trained for a specific task. Each projection head would not communicate with each other. Once the network is trained, the projection head can be discarded. The encoder network and final representations may be used to learn new downstream tasks. As the projection heads have a smaller number of parameters and are easily replaceable, the present system is much more memory and time efficient. In other embodiments, part of a MLP projection head is incorporated into the base encoder during the fine-tuning step. As a result, the model is fine-tuned from a middle layer of the projection head, instead of the input layer of the projection head. Fine-tuning from the first layer of the MLP head is the same as adding a fully-connected layer to the base network and removing a fully-connected layer from the head, and the impact of this extra layer is contingent on the amount of labeled examples during fine-tuning.

In some embodiments, context-based pretext tasks have been designed and applied for self-supervised learning. The design of context-based pretext tasks mainly employs the context features of images or videos such as context similarity, spatial structure, temporal structure, etc. In context similarity, pretext tasks are designed based on the context similarity between image patches. This type of methods includes image clustering-based methods and graph constraint-based methods. In spatial context structure, pretext tasks are based on the spatial relations among image patches. This type of methods includes image jigsaw puzzle, context prediction, and geometric transformation recognition, etc. In temporal context structure, the temporal order from videos is used as supervision signal. The encoder is trained to verify whether the input frame sequence in correct order or to recognize the order of the frame sequence.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The invention claimed is:

1. A method for efficient machine learning, comprising the steps of:
    inputting labeled data, unlabeled data and test data into a computer memory;
    performing an initial self-supervised learning using the labeled data, the unlabeled data, and the test data to output a trained teacher model;
    supervised finetuning the trained teacher model using the labeled data and the test data to output a finetuned teacher model, wherein supervised finetuning of the trained teacher model or semi-supervised training of the trained student model stops when an accuracy of the finetuned teacher model or the updated student model does not improve in consecutive epochs;
    performing a semi-supervised learning guided by the finetuned teacher model using the labeled data, the unlabeled data, and the test data to output a trained student model;
    acquiring a first data output by the finetuned teacher model and a second data output by the trained student model;
    obtaining a distillation loss value according to a distillation loss function based on a difference between the first data output and the second data output;
    updating parameters of the trained student model based on the distillation loss value until the distillation loss value stops decreasing; and,
    outputting a target student model when the knowledge distillation training is completed.

2. The method of claim 1, further comprising:
    removing similar data from the unlabeled data through a duplicate removal module to output updated unlabeled data;
    performing an active learning using the finetuned teacher model and the updated unlabeled data to select a subset of the updated unlabeled data for human to validate and annotate; and
    updating the labeled data with newly annotated data for a next iteration.

3. The method of claim 1, wherein supervised finetuning of the trained teacher model or semi-supervised training of the trained student model stops when the finetuned teacher model or the updated student model reach a target accuracy.

4. The method of claim 1, further comprising removing similar images using cosine similarity of the extracted feature of the unlabeled dataset.

5. The method of claim 1, wherein the trained teacher model comprises one or more convolutional neural networks.

6. The method of claim 1, wherein the trained teacher model comprises a single base convolutional encoder that is pre-trained using contrastive loss for self-supervised learning.

7. The method of claim 1, wherein the finetuned teacher model is a complex model which is trained and completes the same task as the trained student model.

8. A system for efficient machine learning with knowledge distillation, comprising:

a database server executed by one or more storage devices for storing data comprising real-time data and historical data;

a data analytics system comprising one or more convolutional neural networks; and a standard dashboard;

wherein the data analytics system comprises a non-transitory computer-readable medium and instructions that when executed by the non-transitory computer-readable medium cause the non-transitory computer-readable medium to perform operations comprising:

inputting labeled data, unlabeled data and test data into a computer memory;

performing an initial self-supervised learning using the labeled data, the unlabeled data, and the test data to output a trained teacher model, wherein the trained teacher model comprises a single base convolutional encoder that is pre-trained using contrastive loss for self-supervised learning;

supervised finetuning the trained teacher model using the labeled data and the test data to output a finetuned teacher model;

performing a semi-supervised learning guided by the finetuned teacher model using the labeled data, the unlabeled data, and the test data to output a trained student model;

acquiring a first data output by the finetuned teacher model and a second data output by the trained student model;

obtaining a distillation loss value according to a distillation loss function based on a difference between the first data output and the second data output;

updating parameters of the trained student model based on the distillation loss value until the distillation loss value stops decreasing; and,

outputting a target student model when the knowledge distillation training is completed.

9. The system of claim 8, wherein the instructions perform operations further comprising:

removing similar data from the unlabeled data through a duplicate removal module to output updated unlabeled data;

performing an active learning using the finetuned teacher model and the updated unlabeled data to select a subset of the updated unlabeled data for human to validate and annotate; and updating the labeled data with newly annotated data for a next iteration.

10. The system of claim 8, wherein supervised finetuning of the trained teacher model or semi-supervised training of the trained student model stops when the updated teacher model or the updated student model reach target accuracy.

11. The system of claim 8, wherein supervised finetuning of the trained teacher model or semi-supervised training of the trained student model stops when an accuracy of the finetuned teacher model or the updated student model does not improve in consecutive epochs.

12. The system of claim 8, wherein the instructions perform operations further comprising removing similar images using cosine similarity of the extracted feature of the unlabeled dataset.

13. The system of claim 8, wherein the trained teacher model comprises one or more convolutional neural networks.

14. The system of claim 8, wherein the updated teacher model is a complex model which is trained and completes the same task as the trained student model.

* * * * *